(12) United States Patent
Miao et al.

(10) Patent No.: US 12,192,927 B2
(45) Date of Patent: Jan. 7, 2025

(54) CELL-SPECIFIC REFERENCE SIGNAL CONFIGURATION METHOD AND DEVICE, STORAGE MEDIUM, BASE STATION, AND USER EQUIPMENT

(71) Applicant: SPREADTRUM SEMICONDUCTOR (NANJING) CO., LTD., Jiangsu (CN)

(72) Inventors: Runquan Miao, Shanghai (CN); Hualei Wang, Shanghai (CN)

(73) Assignee: SPREADTRUM SEMICONDUCTOR (NANJING) CO., LTD., Jiangsu (CN)

(*) Notice: Subject to any disclaimer, the term of this patent is extended or adjusted under 35 U.S.C. 154(b) by 325 days.

(21) Appl. No.: 17/636,748

(22) PCT Filed: Aug. 20, 2020

(86) PCT No.: PCT/CN2020/110127
§ 371 (c)(1),
(2) Date: Feb. 18, 2022

(87) PCT Pub. No.: WO2021/036889
PCT Pub. Date: Mar. 4, 2021

(65) Prior Publication Data
US 2022/0295427 A1     Sep. 15, 2022

(30) Foreign Application Priority Data
Aug. 23, 2019   (CN) .......................... 201910788520.6

(51) Int. Cl.
*H04W 56/00* (2009.01)
*H04L 5/00* (2006.01)
*H04L 27/26* (2006.01)

(52) U.S. Cl.
CPC ......... *H04W 56/001* (2013.01); *H04L 5/0051* (2013.01); *H04L 27/2614* (2013.01)

(58) Field of Classification Search
CPC . H04W 56/001; H04L 5/0051; H04L 27/2614
See application file for complete search history.

(56) References Cited

U.S. PATENT DOCUMENTS

| 6,473,467 B1 | 10/2002 | Wallace et al. |
| 2011/0141987 A1 | 6/2011 | Nam et al. |

(Continued)

FOREIGN PATENT DOCUMENTS

| CN | 102668644 A | 9/2012 |
| CN | 110519033 A | 11/2019 |

(Continued)

OTHER PUBLICATIONS

EPO Extended European Search Report for corresponding EP Application No. 20856823.8; Mailing Date, Oct. 17, 2022.

(Continued)

*Primary Examiner* — Derrick V Rose
(74) *Attorney, Agent, or Firm* — CANTOR COLBURN LLP (57) ABSTRACT

A cell-specific reference signal configuration method and device, a storage medium, a base station, and a UE are provided. The method includes: determining to configure a regular cell-specific reference signal in a current time slot; determining an SSB in the current time slot based on the SSB existing in the current time slot, or determining an SSB in a previous SSB time slot based on an SSB not existing in the current time slot and indicating a modulation mode of the regular cell-specific reference signal in the current time slot using modulation mode indication information in the determined SSB, or determining the modulation mode of the regular cell-specific reference signal to be a preset modulation mode, wherein a peak-to-average ratio of the modulation mode of the regular cell-specific reference signal isn't (Continued)

greater than that of data to be demodulated by using the regular cell-specific reference signal.

17 Claims, 4 Drawing Sheets

(56) References Cited

U.S. PATENT DOCUMENTS

| | | |
|---|---|---|
| 2014/0321306 A1 | 10/2014 | Nam et al. |
| 2015/0372851 A1 | 12/2015 | Kakishima et al. |
| 2018/0097677 A1 | 4/2018 | Guey et al. |
| 2018/0167923 A1* | 6/2018 | Yang ............... H04W 56/0015 |
| 2020/0235900 A1* | 7/2020 | Yang ............... H04L 5/0094 |
| 2021/0235456 A1* | 7/2021 | Xu .................. H04W 56/0015 |
| 2022/0104153 A1* | 3/2022 | Ko .................. H04L 5/00 |

FOREIGN PATENT DOCUMENTS

| | | |
|---|---|---|
| JP | 2014143605 A | 8/2014 |
| WO | 2018175724 A1 | 9/2018 |

OTHER PUBLICATIONS

Ericsson et al., "NB LTE—Concept Description L1", 3GPP TSG-RAN #69, RP-151397, Sep. 14-16, 2015, 24 pages.

Huawei et al., "LAA synchronization signals for one-shot detection", 3GPP TSG RAN WG1 Meeting #82bis, RI-155644, Oct. 5-9, 2015, 6 pages.

Ipin First Examination Report corresponding to IN Application No. 202217015736; Mailing Date, Aug. 8, 2022.

3rd Generation Partnership Project et al., "Technical Specification", 3GPP TS 36.211, V15.6.0, Jun. 2019, Release 15, pp. 1-8.

3rd Generation Partnership Project et al., "Technical Specification", 3GPP TS 36.211, V15.6.0, Jun. 2019, Release 15, pp. 9-95.

3rd Generation Partnership Project et al., "Technical Specification", 3GPP TS 36.211, V15.6.0, Jun. 2019, Release 15, pp. 36-187.

3rd Generation Partnership Project et al., "Technical Specification", 3GPP TS 36.211, V15.6.0, Jun. 2019, Release 15, pp. 188-239.

JPO Notice of Reasons for Refusal for corresponding JP Application No. 2022-512397; Issued on May 9, 2023.

3GPP TS 38.211 V15.6.0; "Technical Specification Group Radio Access Network; NR; Physical Channels and Modulation"; Jun. 20, 2019; 93 pages.

Qualcomm Incorporated, "Lower PAPR reference signals"; 3GPP TSG-RAN WG1 Meeting #96; R1-1903468; Feb. 25-Mar. 1, 2019; 25 pages.

Samsung, "View on Low PAPR RS", 3GPP TSG RAN WG1Meeting #96bis; R1-1904452; Apr. 8-12, 2019; 3 pages.

International Search Report for International Application No. PCT/CN2020/110127; Date of Mailing, Nov. 24, 2020.

* cited by examiner

CELL-SPECIFIC REFERENCE SIGNAL CONFIGURATION METHOD AND DEVICE, STORAGE MEDIUM, BASE STATION, AND USER EQUIPMENT

CROSS-REFERENCE TO RELATED APPLICATIONS

This is the U.S. national stage of application No. PCT/CN2020/110127, filed on Aug. 20, 2020. Priority under 35 U.S.C. § 119(a) and 35 U.S.C. § 365(b) is claimed from Chinese Application No. 201910788520.6, filed Aug. 23, 2019, the disclosure of which is also incorporated herein by reference.

TECHNICAL FIELD

The present disclosure generally relates to communication technology field, and more particularly, to a cell-specific reference signal configuration method and device, a storage medium, a base station and a User Equipment (UE).

BACKGROUND

Modulation methods for a Physical Downlink Shared Channel (PDSCH) include $$\frac{\pi}{2}\text{-Binary Phase Shift Keying } (BPSK),$$

Quadrature Phase Shift Keying (QPSK), 8 Phase Shift Keying (PSK) and 16 Amplitude Phase Shift Keying (APSK). Single-carrier waveforms can be mapped to a frequency domain by Transform Precoding (i.e., Discrete Fourier Transform (DFT)).

$$\frac{\pi}{2}\text{-}BPSK$$

has a smaller Peak-to-Average Power Ratio (PAPR) than other modulation methods, and modulated symbols mapped to the frequency domain through DFT have a smaller PAPR than those directly mapped to the frequency domain.

Cell-Specific Reference Signal (CRS) may include regular CRS and additional CRS, where the regular CRS is certainly included, and the additional CRS may or may not be available (a base station informs a terminal through broadcasting whether the additional CRS is configured or not). The regular CRS and the additional CRS have a same position in the frequency domain, and each occupies a specific symbol in a time domain. The CRS is generated by a Pseudo-Noise Code (PN) sequence and modulated by QPSK, and the generated modulation symbol sequence is as follows:

$$r(m) = \frac{1}{\sqrt{2}}(1 - 2 \cdot c(2m)) + j\frac{1}{\sqrt{2}}(1 - 2 \cdot c(2m+1)).$$

The mapping of CRS symbols is directly mapped in the frequency domain, and no DFT transform is required.

In a Long Term Evolution (LTE) system, whether a cell works in a Frequency Division Duplex (FDD) mode or a Time Division Duplex (TDD) mode can be determined according to a relative position between a Primary Synchronization Signal (PSS) and a Secondary Synchronization Signal (SSS), and configuration of Cyclic Prefix (CP) of the cell can be further determined based on an exact position of the SSS. In New Radio (NR), PSS, SSS and Physical Broadcast Channel (PBCH) are bound to be sent, which is called a Synchronization Signal Block (SSB). SSB only appears in some slots called SSB slots, while slots not including SSB are called non-SSB slots. Master Information Block (MIB) is carried through PBCH.

In a domestic satellite communication system, CRS is used for demodulation of PDSCH, PDCCH and PBCH. For CRS, MIB includes Additional CRS Indication to indicate whether to configure the additional CRS.

SUMMARY

Embodiments of the present disclosure may improve performance of data demodulation using a cell-specific reference signal.

In an embodiment of the present disclosure, a cell-specific reference signal configuration method is provided, including: determining to configure a regular cell-specific reference signal in a current time slot; determining an SSB in the current time slot based on the SSB existing in the current time slot, or determining an SSB in a previous SSB time slot before the current time slot based on an SSB not existing in the current time slot; and indicating a modulation mode of the regular cell-specific reference signal in the current time slot using modulation mode indication information in the determined SSB, or determining the modulation mode of the regular cell-specific reference signal to be a preset modulation mode, wherein a peak-to-average ratio of the modulation mode of the regular cell-specific reference signal is less than or equal to a peak-to-average ratio of a modulation mode of data to be demodulated by using the regular cell-specific reference signal.

In an embodiment of the present disclosure, a cell-specific reference signal determination method is provided, including: receiving an SSB in a current time slot based on the SSB existing in the current time slot, or receiving an SSB in a previous SSB time slot before the current time slot based on an SSB not existing in the current time slot; and determining a modulation mode of a regular cell-specific reference signal in the current time slot based on modulation mode indication information in the received SSB, or determining the modulation mode of the regular cell-specific reference signal to be a preset modulation mode, wherein a peak-to-average ratio of the modulation mode of the regular cell-specific reference signal is less than or equal to a peak-to-average ratio of a modulation mode of data to be demodulated by using the regular cell-specific reference signal.

In an embodiment of the present disclosure, a storage medium having computer instructions stored therein is provided, wherein when the computer instructions are executed, the above cell-specific reference signal configuration method is performed.

In an embodiment of the present disclosure, a base station including a memory and a processor is provided, wherein the memory has computer instructions stored therein, and when the processor executes the computer instructions, the above cell-specific reference signal configuration method is performed.

DETAILED DESCRIPTION

The current CRS fixedly adopts the QPSK modulation method, and the demodulated CRS is used for PDSCH demodulation. In some configurations (for example, PDSCH adopts a single-carrier waveform and $$\frac{\pi}{2}\text{-}BPSK$$

modulation), the PAPR of the PDSCH may be smaller than that of the CRS, and a reception power of the CRS is lower than or equal to that of the PDSCH, which reduces demodulation performance of the PDSCH.

In embodiments of the present disclosure, by configuring the modulation mode of the regular cell-specific reference signal, and setting a peak-to-average ratio of the modulation mode of the regular cell-specific reference signal to be less than or equal to a peak-to-average ratio of a modulation mode of data to be demodulated by using the regular cell-specific reference signal, modulation mode configuration of the regular cell-specific reference signal may be more flexible, and the peak-to-average ratio of the cell-specific reference signal is reduced to ensure that the reception power of the regular cell-specific reference signal is greater than that of the data to be demodulated, such as greater than PDSCH, so as to improve performance of data demodulation using the cell-specific reference signal.

In order to clarify the objects, characteristics and advantages of the disclosure, embodiments of present disclosure will be described in detail in conjunction with accompanying drawings.

Figure 1:
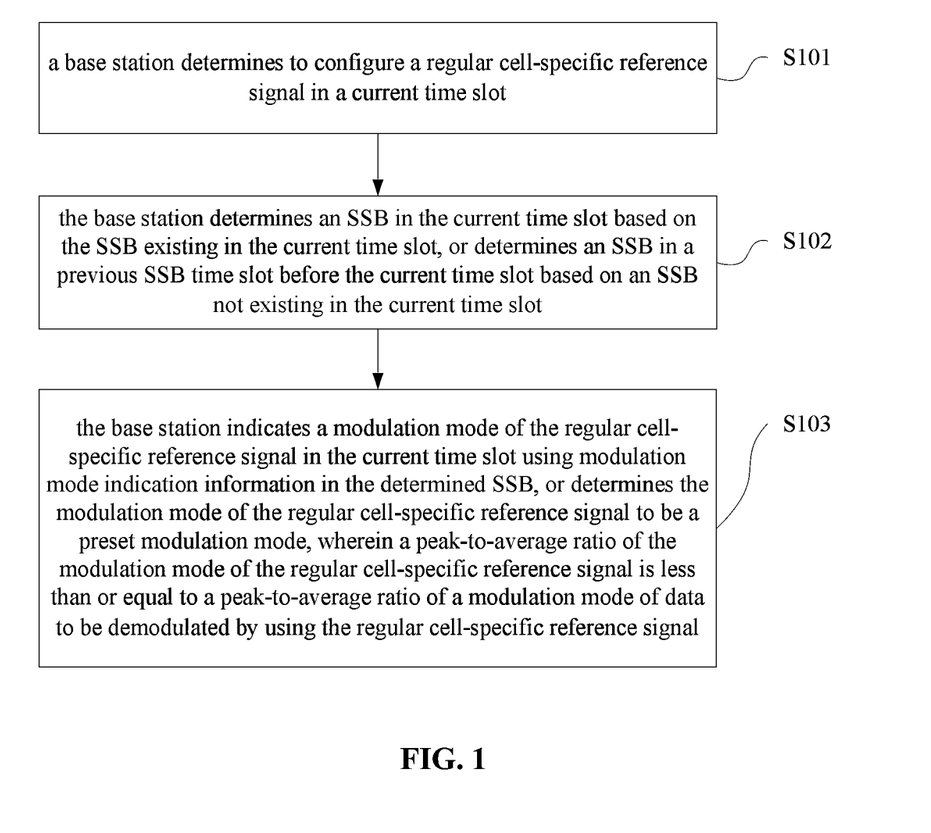
FIG. 1 is a flow chart of a cell-specific reference signal configuration method according to an embodiment.

FIG. 1 is a flow chart of a cell-specific reference signal configuration method according to an embodiment.

The method may be applied to a base station side, that is, may be performed by a base station.

The method may include S101 to S103.

In S101, a base station determines to configure a regular cell-specific reference signal in a current time slot.

In S102, the base station determines an SSB in the current time slot based on the SSB existing in the current time slot, or determines an SSB in a previous SSB time slot before the current time slot based on an SSB not existing in the current time slot.

In S103, the base station indicates a modulation mode of the regular cell-specific reference signal in the current time slot using modulation mode indication information in the determined SSB, or determines the modulation mode of the regular cell-specific reference signal to be a preset modulation mode, wherein a peak-to-average ratio of the modulation mode of the regular cell-specific reference signal is less than or equal to a peak-to-average ratio of a modulation mode of data to be demodulated by using the regular cell-specific reference signal.

It should be noted that the sequence number of each step in the embodiments does not limit an execution order of the step.

In some embodiments, in S101, a regular CRS may be configured in each time slot. The current time slot may be an SSB slot, that is, a time slot including SSB, or a non-SSB time slot, that is, a time slot not including SSB.

Specifically, the regular CRS can be used to demodulate subsequent data, for example, PDSCH or PBCH.

In some embodiments, in S102, the base station determines an SSB in a current time slot based on the SSB existing in the current time slot (i.e., the current time slot is an SSB slot), or determines an SSB in a previous SSB time slot before the current time slot based on an SSB not existing in the current time slot (i.e., the current time slot is a non-SSB slot).

Figure 2A:
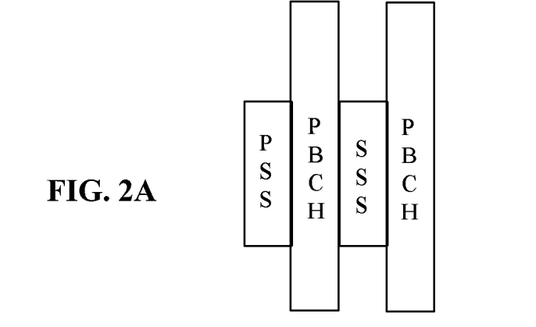
FIG. 2A and FIG. 2B are structural diagrams of an SSB according to an embodiment.
Figure 2B:
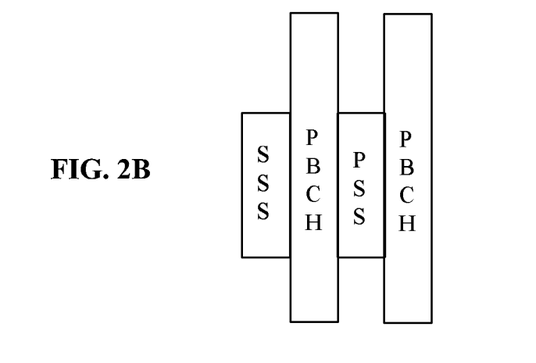

A specific structure of SSB can be referred to FIG. 2A and FIG. 2B. The SSB may include a PSS, an SSS, and a PBCH carrying an MIB.

In some embodiments, in S103, the base station may carry modulation mode indication information in the SSB, where the modulation mode indication information may indicate the modulation mode of the regular CRS. Alternatively, the base station may determine that the modulation mode of the regular CRS is a preset modulation mode.

In some embodiments, the modulation mode of the regular cell-specific reference signal is selected from a group consisting of $$\frac{\pi}{2}\text{-}BPSK$$

and QPSK. That is, the preset modulation mode may be selected from a group consisting of $$\frac{\pi}{2}\text{-}BPSK$$

and QPSK.

In some embodiments, based on the PDSCH adopting a single-carrier waveform and the $$\frac{\pi}{2}\text{-}BPSK$$

modulation mode, the base station may configure the regular CRS modulation mode to be $$\frac{\pi}{2}\text{-}BPSK,$$

thus, a reception power of the CRS is higher than that of the PDSCH, which improves demodulation performance of the PDSCH.

It could be understood that, following indicating the modulation mode of the regular CRS to the UE, the base station may use the modulation mode to modulate the regular CRS, and send the modulated regular CRS. In response to receiving the modulation mode indication information from the base station, the UE may determine the modulation mode of the regular CRS. In response to receiving the modulated regular CRS from the base station, the UE uses the determined modulation mode of the regular CRS to perform demodulation on the modulated regular CRS to obtain the regular CRS. The UE may demodulate PBCH and/or PDSCH using the regular CRS.

In the embodiments of the present disclosure, by configuring the modulation mode of the regular cell-specific reference signal, and setting a peak-to-average ratio of the modulation mode of the regular cell-specific reference signal to be less than or equal to a peak-to-average ratio of a modulation mode of data to be demodulated by using the regular cell-specific reference signal, modulation mode configuration of the regular cell-specific reference signal may be more flexible, and the peak-to-average ratio of the cell-specific reference signal is reduced to ensure that the reception power of the regular cell-specific reference signal is greater than that of the data to be demodulated, such as greater than PDSCH, so as to improve performance of data demodulation using the cell-specific reference signal.

In some embodiments, S103 as shown in FIG. 1 may include indicating the modulation mode of the regular cell-specific reference signal in the current time slot using modulation mode indication information in an MIB in the determined SSB.

In some embodiments, the modulation mode indication information is carried in the MIB to indicate the modulation mode of the regular CRS in the current time slot. The MIB can be broadcast to all UEs, and the modulation mode indication information may be added to the MIB to directly indicate the modulation mode of the regular cell-specific reference signal.

In response to receiving the MIB, the UE may directly determine content of the modulation mode indication information from the MIB to determine the modulation mode of the regular CRS.

In some embodiments, a new field is added to the MIB, and the modulation mode indication information is carried in the newly added field, so as to indicate the modulation mode of the regular cell-specific reference signal in the current time slot.

As an original field in the MIB is used to indicate whether the additional CRS is configured, a new field may be added to indicate relevant information of the regular CRS. A value of this field may represent the modulation mode of the regular CRS. For example, the newly added field of 0 indicates that the modulation method of the regular CRS is $$\frac{\pi}{2}\text{-}BPSK,$$

and the newly added field of 1 indicates that the modulation method of the regular CRS is QPSK.

It should be noted that the current time slot in the embodiments may be a non-SSB slot rather than an SSB slot. For a first time slot of initial access, the first time slot is an SSB slot. When receiving an SSB on the first SSB slot, there is no previous available MIB information, thus, the MIB cannot be used to indicate the modulation method of the regular CRS.

In some embodiments, the modulation mode indication information includes a relative time domain position relation between a PSS and an SSS in the determined SSB. S103 as shown in FIG. 1 includes: indicating the modulation mode of the regular cell-specific reference signal in the current time slot using the relative time domain position relation between the PSS and the SSS in the determined SSB.

Referring to FIG. 2A and FIG. 2B, FIG. 2A and FIG. 2B are a structural diagrams of a SSB according to an embodiment. There are two cases FIG. 2A and FIG. 2B which indicate that positions of the PSS and the SSS in the SSB are different in the time domain. As shown in the case in FIG. 2A, the time domain position of the PSS is in front of the time domain position of the SSS. As shown in the case in FIG. 2B, the time domain position of the SSS is in front of the time domain position of the PSS. In other words, the time domain position relation between the PSS and the SSS has the above two cases.

Therefore, the time domain position relation between the PSS and the SSS can indicate the modulation mode of the regular CRS in the current time slot. For example, the time domain position relation between the PSS and the SSS in the case a may indicate $$\frac{\pi}{2}\text{-}BPSK,$$

and the time domain position relation between the PSS and the SSS in the case b may indicate QPSK.

Figure 3:
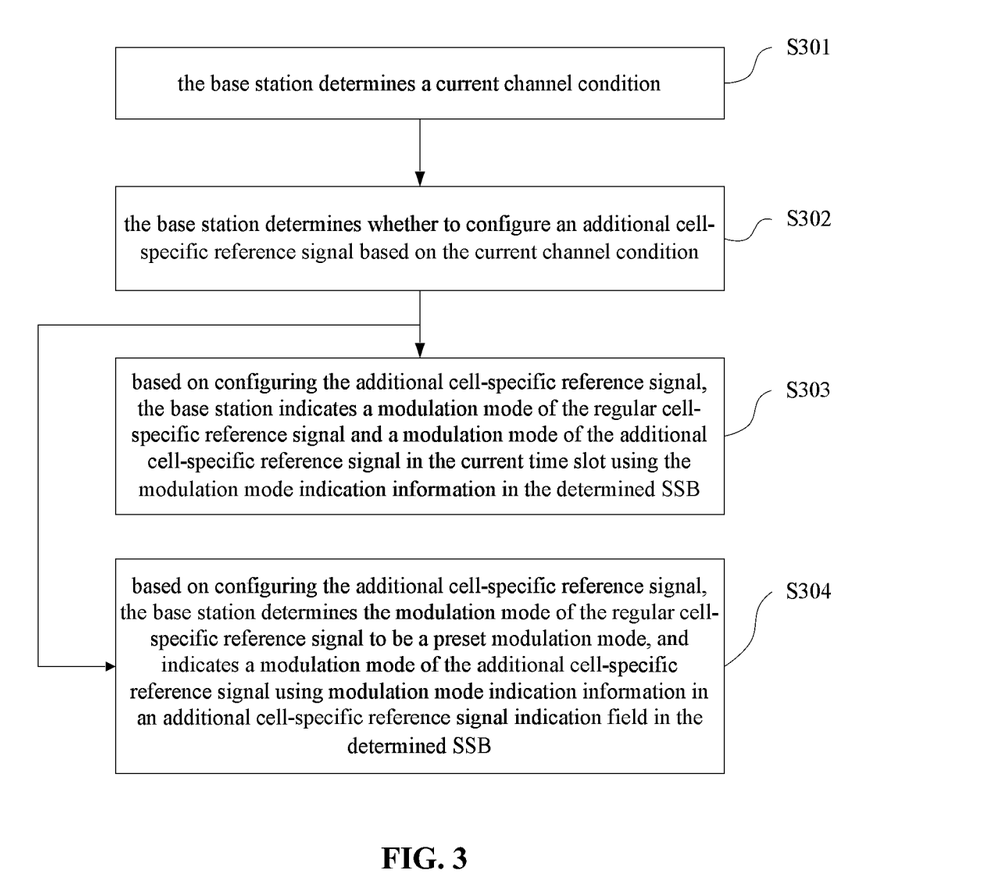
FIG. 3 is a partial flow chart of a cell-specific reference signal configuration method according to an embodiment.

In some embodiments, referring to FIG. 3, before S103 as shown in FIG. 1, the method further includes S301 and S302.

In S301, the base station determines a current channel condition.

In S302, the base station determines whether to configure an additional cell-specific reference signal based on the current channel condition.

In some embodiments, the base station may determine whether to configure the additional CRS for the UE according to the current channel condition. Specifically, base on the channel condition being poor, for example, channel quality is lower than or equal to a preset value, the base station may configure the additional CRS for the UE.

Those skilled in the art could understand that a specific implementation way of configuring the additional CRS belongs to an implementation solution of a base station manufacturer, and may be referred to existing solutions, which is not described in detail here.

S103 as shown in FIG. 1 may include S303 and S304.

In S303, based on configuring the additional cell-specific reference signal, the base station indicates a modulation mode of the regular cell-specific reference signal and a modulation mode of the additional cell-specific reference signal in the current time slot using the modulation mode indication information in the determined SSB.

In S304, based on configuring the additional cell-specific reference signal, the base station determines the modulation mode of the regular cell-specific reference signal to be a preset modulation mode, and indicates a modulation mode of the additional cell-specific reference signal using modulation mode indication information in an additional cell-specific reference signal indication field in the determined SSB.

In some embodiments, one of S303 and S304 is performed optionally.

Compared with the foregoing embodiments where the modulation mode of the regular CRS is the same as the modulation mode of the additional CRS, in some embodiments, the modulation mode of the regular CRS may be different from the modulation mode of the additional CRS, which makes configuration of the modulation mode of the CRS more flexible.

In some embodiments, in S303, the base station may indicate the modulation mode of the regular CRS and the modulation mode of the additional CRS in the current time slot using the modulation mode indication information in the SSB. A specific implementation way may include indicating by using a newly added domain in the MIB or the relative time domain position relation between the PSS and the SSS. Details can be referred to the foregoing embodiments, and are not repeated here.

In some embodiments, in S304, the modulation mode of the regular CRS may be determined to be a fixed adjustment mode, and the modulation mode of the additional CRS may be indicated using the modulation mode indication information in the additional CRS indication domain in the SSB. Specifically, the modulation mode of the additional CRS may be indicated by using a value of the additional cell-specific reference signal indication field in the MIB.

For example, the additional CRS indication field of 00 indicates that the base station is not configured with the additional CRS; the additional CRS indication field of 10 indicates that the base station is configured with the additional CRS, and the modulation mode of the additional CRS is $$\frac{\pi}{2}-BPSK;$$

and the additional CRS indication field of 11 indicates that the base station is configured with the additional CRS, and the modulation mode of the additional CRS is QPSK.

In an embodiment, a cell-specific reference signal determination method is provided. The method may be applied to a UE side, that is, may be performed by a UE.

The method may include: receiving an SSB in a current time slot based on the SSB existing in the current time slot, or receiving an SSB in a previous SSB time slot before the current time slot based on an SSB not existing in the current time slot; and determining a modulation mode of a regular cell-specific reference signal in the current time slot based on modulation mode indication information in the received SSB, or determining the modulation mode of the regular cell-specific reference signal to be a preset modulation mode, wherein a peak-to-average ratio of the modulation mode of the regular cell-specific reference signal is less than or equal to a peak-to-average ratio of a modulation mode of data to be demodulated by using the regular cell-specific reference signal.

In some embodiments, for the current time slot where an SSB exists, i.e., an SSB slot, the UE may use the SSB in the current time slot to determine the modulation mode of the regular CRS; for the current time slot where an SSB does not exist, i.e., a non-SSB slot, the UE may use an SSB in a previous SSB slot to determine the modulation mode of the regular CRS.

A specific implementation way of determining the modulation mode of the regular CRS may be indicated using a newly added field in the MIB or a relative time domain position relation between the PSS and the SSS, which can be referred to the above embodiments and is not described in detail here.

Figure 4:
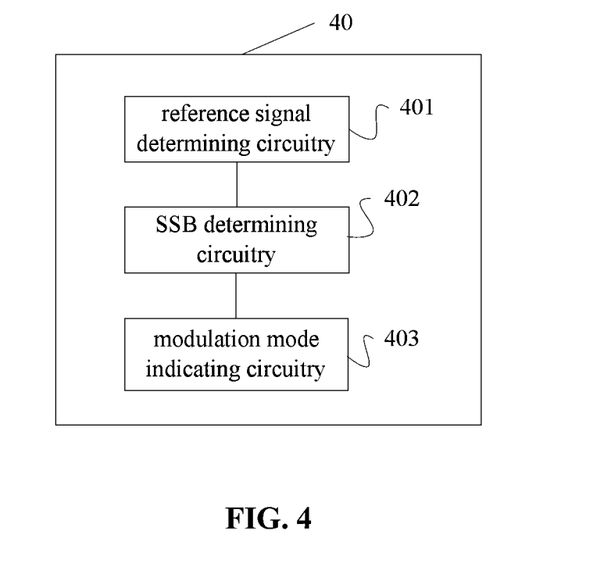
FIG. 4 is a structural diagram of a cell-specific reference signal configuration device according to an embodiment.

Referring to FIG. 4, FIG. 4 is a structural diagram of a cell-specific reference signal configuration device according to an embodiment.

The device 40 includes: a reference signal determining circuitry 401 configured to determine to configure a regular cell-specific reference signal in a current time slot; an SSB determining circuitry 402 configured to: determine an SSB in the current time slot based on the SSB existing in the current time slot, or determine an SSB in a previous SSB time slot before the current time slot based on an SSB not existing in the current time slot; and a modulation mode indicating circuitry 403 configured to: indicate a modulation mode of the regular cell-specific reference signal in the current time slot using modulation mode indication information in the determined SSB, or determine the modulation mode of the regular cell-specific reference signal to be a preset modulation mode, wherein a peak-to-average ratio of the modulation mode of the regular cell-specific reference signal is less than or equal to a peak-to-average ratio of a modulation mode of data to be demodulated by using the regular cell-specific reference signal.

In the embodiments of the present disclosure, by configuring the modulation mode of the regular cell-specific reference signal, and setting a peak-to-average ratio of the modulation mode of the regular cell-specific reference signal to be less than or equal to a peak-to-average ratio of a modulation mode of data to be demodulated by using the regular cell-specific reference signal, modulation mode configuration of the regular cell-specific reference signal may be more flexible, and the peak-to-average ratio of the cell-specific reference signal is reduced to ensure that the reception power of the regular cell-specific reference signal is greater than that of the data to be demodulated, such as greater than PDSCH, so as to improve performance of data demodulation using the cell-specific reference signal.

More details of working principles and working modes of the device 40 can be found in the above descriptions of FIG. 1 to FIG. 3, and are not described here.

In an embodiment of the present disclosure, a storage medium having computer instructions stored therein is provided, wherein when the computer instructions are executed, any one of the above methods as shown in FIG. 1, FIG. 2A, FIG. 2B or FIG. 3 is performed. The storage medium may include a Read Only Memory (ROM), a Random Access Memory (RAM), a magnetic disk or an optical disk. In some embodiments, the storage medium may be a computer readable storage medium, such as a non-volatile memory or a non-transitory memory.

In an embodiment of the present disclosure, a base station including a memory and a processor is provided, wherein the memory has computer instructions stored therein, and when the processor executes the computer instructions, the method as shown in FIG. 1, FIG. 2A, FIG. 2B, or FIG. 3 is performed.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A cell-specific reference signal configuration method, comprising:
    determining to configure a regular cell-specific reference signal in a current time slot;
    determining a Synchronization Signal Block (SSB) in the current time slot based on the SSB existing in the current time slot, or determining an SSB in a previous SSB time slot before the current time slot based on an SSB not existing in the current time slot; and
    indicating a modulation mode of the regular cell-specific reference signal in the current time slot using modulation mode indication information in the determined SSB, or determining the modulation mode of the regular cell-specific reference signal to be a preset modulation mode, wherein a peak-to-average ratio of the modulation mode of the regular cell-specific reference signal is less than or equal to a peak-to-average ratio of a modulation mode of data to be demodulated by using the regular cell-specific reference signal.

2. The method according to claim 1, wherein said indicating a modulation mode of the regular cell-specific reference signal in the current time slot using modulation mode indication information in the determined SSB comprises:
indicating the modulation mode of the regular cell-specific reference signal in the current time slot using modulation mode indication information in a Master Information Block (MIB) in the determined SSB.

3. The method according to claim 2, wherein said indicating a modulation mode of the regular cell-specific reference signal in the current time slot using modulation mode indication information in the MIB in the determined SSB comprises:
adding a new field to the MIB, and carrying the modulation mode indication information in the newly added field, so as to indicate the modulation mode of the regular cell-specific reference signal in the current time slot.

4. The method according to claim 1, wherein the modulation mode indication information comprises a relative time domain position relation between a Primary Synchronization Signal (PSS) and a Secondary Synchronization Signal (SSS) in the determined SSB, and said indicating a modulation mode of the regular cell-specific reference signal in the current time slot using modulation mode indication information in the determined SSB comprises:
indicating the modulation mode of the regular cell-specific reference signal in the current time slot using the relative time domain position relation between the PSS and the SSS in the determined SSB.

5. The method according to claim 1, wherein prior to indicating a modulation mode of the regular cell-specific reference signal in the current time slot using modulation mode indication information in the determined SSB, the method further comprises:
determining a current channel condition; and
determining whether to configure an additional cell-specific reference signal based on the current channel condition.

6. The method according to claim 5, wherein said indicating a modulation mode of the regular cell-specific reference signal in the current time slot using modulation mode indication information in the determined SSB comprises:
based on configuring the additional cell-specific reference signal, indicating a modulation mode of the regular cell-specific reference signal and a modulation mode of the additional cell-specific reference signal in the current time slot using the modulation mode indication information in the determined SSB; or
based on configuring the additional cell-specific reference signal, determining the modulation mode of the regular cell-specific reference signal to be a preset modulation mode, and indicating a modulation mode of the additional cell-specific reference signal using modulation mode indication information in an additional cell-specific reference signal indication field in the determined SSB.

7. The method according to claim 1, wherein the modulation mode of the regular cell-specific reference signal is selected from a group consisting of $$\frac{\pi}{2}\text{-}BPSK$$

and QPSK.

8. A cell-specific reference signal determination method, comprises:
receiving a Synchronization Signal Block (SSB) in a current time slot based on the SSB existing in the current time slot, or receiving an SSB in a previous SSB time slot before the current time slot based on an SSB not existing in the current time slot; and
determining a modulation mode of a regular cell-specific reference signal in the current time slot based on modulation mode indication information in the received SSB, or determining the modulation mode of the regular cell-specific reference signal to be a preset modulation mode, wherein a peak-to-average ratio of the modulation mode of the regular cell-specific reference signal is less than or equal to a peak-to-average ratio of a modulation mode of data to be demodulated by using the regular cell-specific reference signal.

9. A non-transitory storage medium storing one or more programs, the one or more programs comprising computer instructions, which, when executed by a processor, cause the processor to:
determine to configure a regular cell-specific reference signal in a current time slot;
determine a Synchronization Signal Block (SSB) in the current time slot based on the SSB existing in the current time slot, or determining an SSB in a previous SSB time slot before the current time slot based on an SSB not existing in the current time slot; and
indicate a modulation mode of the regular cell-specific reference signal in the current time slot using modulation mode indication information in the determined SSB, or determining the modulation mode of the regular cell-specific reference signal to be a preset modulation mode, wherein a peak-to-average ratio of the modulation mode of the regular cell-specific reference signal is less than or equal to a peak-to-average ratio of a modulation mode of data to be demodulated by using the regular cell-specific reference signal.

10. A base station comprising a memory and a processor, wherein the memory has computer instructions stored therein, and when the processor executes the computer instructions, the method of claim 1 is performed.

11. A User Equipment (UE) comprising a memory and a processor, wherein the memory has computer instructions stored therein, and when the processor executes the computer instructions, the method of claim 8 is performed.

12. The non-transitory storage medium according to claim 9, wherein said indicating a modulation mode of the regular cell-specific reference signal in the current time slot using modulation mode indication information in the determined SSB comprises:
indicating the modulation mode of the regular cell-specific reference signal in the current time slot using modulation mode indication information in a Master Information Block (MIB) in the determined SSB.

13. The non-transitory storage medium according to claim 12, wherein said indicating a modulation mode of the regular cell-specific reference signal in the current time slot using modulation mode indication information in the MIB in the determined SSB comprises:
adding a new field to the MIB, and carrying the modulation mode indication information in the newly added field, so as to indicate the modulation mode of the regular cell-specific reference signal in the current time slot.

14. The non-transitory storage medium according to claim 9, wherein the modulation mode indication information comprises a relative time domain position relation between a Primary Synchronization Signal (PSS) and a Secondary Synchronization Signal (SSS) in the determined SSB, and said indicating a modulation mode of the regular cell-specific reference signal in the current time slot using modulation mode indication information in the determined SSB comprises:

indicating the modulation mode of the regular cell-specific reference signal in the current time slot using the relative time domain position relation between the PSS and the SSS in the determined SSB.

15. The non-transitory storage medium according to claim 9, wherein prior to indicating a modulation mode of the regular cell-specific reference signal in the current time slot using modulation mode indication information in the determined SSB, the processor is further caused to:

determine a current channel condition; and determine whether to configure an additional cell-specific reference signal based on the current channel condition.

16. The non-transitory storage medium according to claim 15, wherein said indicating a modulation mode of the regular cell-specific reference signal in the current time slot using modulation mode indication information in the determined SSB comprises:

based on configuring the additional cell-specific reference signal, indicating a modulation mode of the regular cell-specific reference signal and a modulation mode of the additional cell-specific reference signal in the current time slot using the modulation mode indication information in the determined SSB; or     based on configuring the additional cell-specific reference signal, determining the modulation mode of the regular cell-specific reference signal to be a preset modulation mode, and indicating a modulation mode of the additional cell-specific reference signal using modulation mode indication information in an additional cell-specific reference signal indication field in the determined SSB.

17. The non-transitory storage medium according to claim 9, wherein the modulation mode of the regular cell-specific reference signal is selected from a group consisting of $$\frac{\pi}{2}\text{-}BPSK$$

and QPSK.